United States Patent [19]
Hofmann

[11] Patent Number: 5,189,774
[45] Date of Patent: Mar. 2, 1993

[54] AUTOMATIC PALLET SWITCHING MECHANISM

[75] Inventor: Dietmar Hofmann, Seebach, Fed. Rep. of Germany

[73] Assignee: MAHO Aktiengesellschaft, Fed. Rep. of Germany

[21] Appl. No.: 909,587

[22] Filed: Jul. 6, 1992

[30] Foreign Application Priority Data

Jul. 4, 1991 [DE] Fed. Rep. of Germany ....... 4122215

[51] Int. Cl.⁵ .................... B23Q 7/14; B65G 17/48
[52] U.S. Cl. .................................. 29/33 P; 198/345.3
[58] Field of Search ................ 29/33 P, 563, 564; 198/345.3, 346.1, 465.1; 414/225; 269/218

[56] References Cited

U.S. PATENT DOCUMENTS

| 3,804,398 | 4/1974 | Bonzi | 269/218 |
|---|---|---|---|
| 4,148,400 | 4/1979 | Cross | 198/345.3 |
| 4,512,068 | 4/1985 | Piotrowski | 29/33 P |
| 4,662,043 | 5/1987 | Stone et al. | 29/563 X |
| 5,133,538 | 7/1992 | Maeda et al. | 29/33 P X |

FOREIGN PATENT DOCUMENTS

| 90251 | 7/1980 | Japan | 29/563 |
|---|---|---|---|
| 39855 | 4/1981 | Japan | 29/33 P |

*Primary Examiner*—William Briggs
*Attorney, Agent, or Firm*—Baker, Maxham, Jester & Meador

[57] ABSTRACT

An automatic pallet switching mechanism comprising a pallet support for accommodating a work pallet in a fixed position, a pallet changer for elevating and rotating the work pallet, and pallet fixing structure having clamping apparatus. For fixing the work pallet at a precise position the fixing structure comprises two clamping slides biased against one another and provided with keys for locking engagement in lateral keyways formed on a locking bolt. At least one of the clamping slides is formed with a lateral recess for engagement therein of a control element. Inside the pallet support there is mounted at least one shaft carrying the control element at one end thereof and having its other end adapted to be coupled with the pallet changer via an operating member.

16 Claims, 1 Drawing Sheet

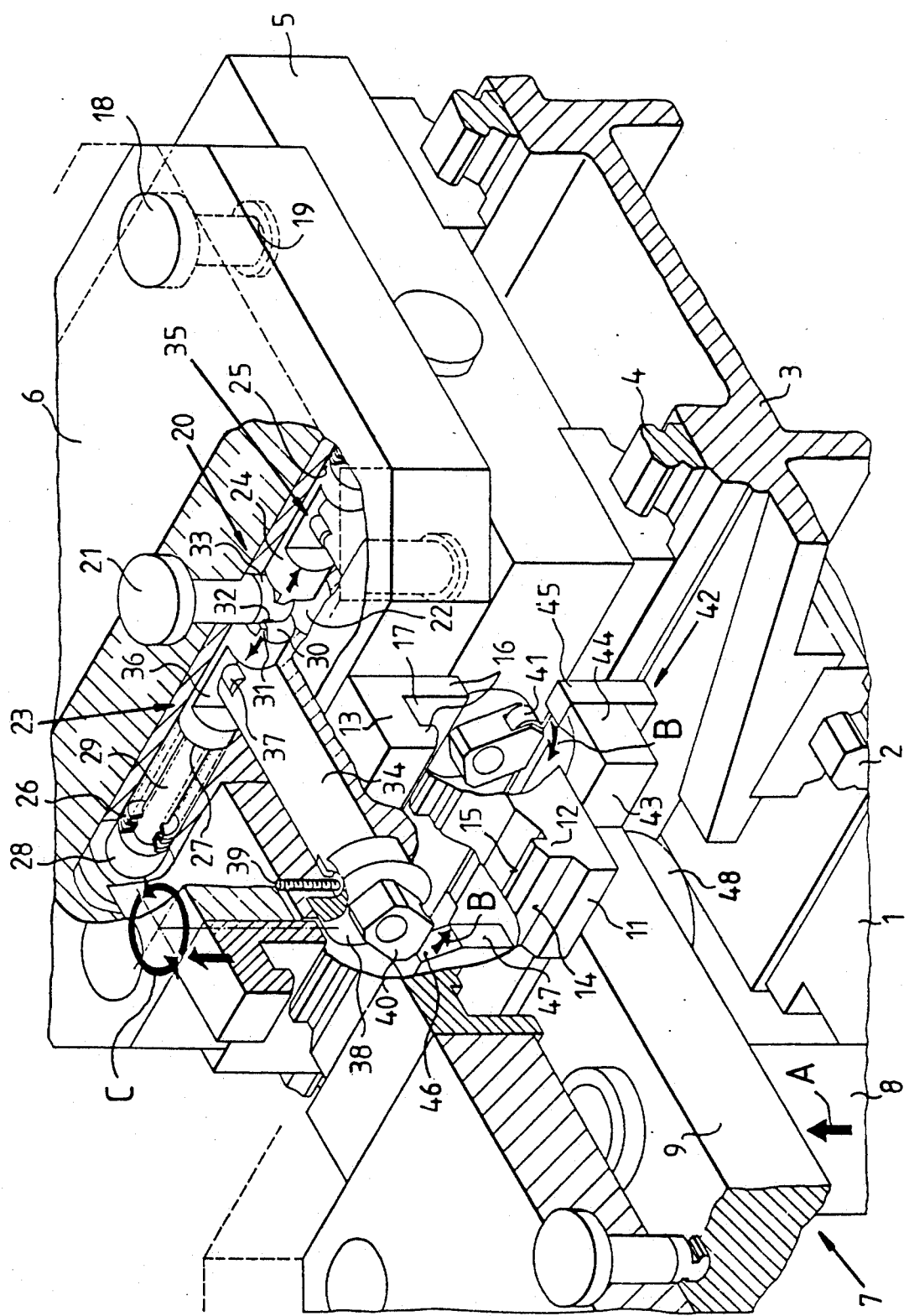

AUTOMATIC PALLET SWITCHING MECHANISM

FIELD OF THE INVENTION

The present invention is generally directed to an automatic pallet switching mechanism, especially for machine tools, and more particularly to such a mechanism having a pallet support for accommodating a work pallet in a fixed position, a pallet changer including a vertically movable support structure and a pallet driver rotatably mounted thereon for lifting and pivoting the work pallet, and pallet fixing structure which includes a clamping device disposed within the pallet support for fixing a locking bolt arranged on the work pallet.

BACKGROUND OF THE INVENTION

Typical of the relevant prior art is German Patent 3,923,574, which discloses a pallet switching mechanism in which a pallet changer comprises a power-driven support structure adapted to be lifted and lowered and including a pallet driver rotatably mounted thereon for changing a pallet disposed on a machine table for a pallet held at the stand-by position. Fixing of the pallet on the machine table is effected by way of several locking and setting bolts arranged on the pallet which are fixedly held in the machine table by a hydraulically operated clamping unit. This mechanism has the drawback that a separate hydraulic drive mechanism is required for operating the pallet fixing means. The pallet changer drive means and the hydraulic drive means for the fixing device are separately actuated and must be matched with each other in a suitable way. A complex control system is therefore required for operating and matching the two separate drive means.

SUMMARY OF THE INVENTION

It is a major objective of the instant invention to provide an automatic pallet switching mechanism which enables automatic and positionally correct fixing of the work pallet on the pallet support without undue efforts of control technology.

The specified objective is realized by clamping apparatus which comprises two clamping slides biased in opposition to each other by compression springs, the slides having keys mounted on their ends facing each other. Lateral keyways are formed in a locking bolt for locking engagement of the keys of the clamping slides therein, and at least one of the clamping slides is provided with a lateral recess for engagement of a control element therein. In the pallet support there is mounted at least one shaft which bears at one end thereof the control element while the other end of the shaft is coupled through an operating member to the vertically movable support of the pallet changer.

The pallet switching mechanism of this invention offers the advantage that the vertical motion of the pallet changer is transformed by mechanical operating and control elements to a horizontal movement of a clamping slide in the pallet support for releasing or locking the pallet fixing means. Hence, neither separate drive means nor separate control means are required for actuating the pallet clamping mechanism. The mechanical coupling between the pallet fixing means and the vertically movable support structure of the pallet changer ensures that the pallet fixing means is automatically released prior to the elevation of the work pallet and is re-locked upon lowering thereof onto the pallet support. The keys on the end faces of the clamping slides are urged by the compression springs into the lateral keyways of the locking bolt, whereby the work pallet is fixed under tension on the pallet support. This self-locking key engagement prevents any automatic release of the fixing means and any movement of the pallet even under the action of the machining forces.

In a particularly advantageous and preferred embodiment of the invention, the control element engaging in the recess of the clamping slide is provided by a groove formed in the end face of the shaft and a roller which is eccentrically offset to the shaft axis and is adapted to be moved together with the clamping slide. Instead of the sliding movement of conventional cams, the roller performs a rolling motion whereby the wear due to friction is reduced and the service life and reliability of the mechanism are increased.

The operating member for rotating the shaft which carries the control element is advantageously provided with an operating lever which is mounted on the free end of the shaft and which, upon elevation of the support, is guided along side faces which initially extend obliquely inwardly. It is thereby possible by simple mechanism means to transform the vertical motion of the support to a horizontal motion of the clamping slides.

In accordance with a further advantageous embodiment, the outside of the operating lever which comes into engagement with the coupling member has a rotatable roller mounted thereon. Friction and wear between the operating lever and the coupling member are thereby reduced.

Advantageously, the compression springs for biasing the clamping slides are configured as Belleville spring washers, by means of which it is possible to produce the high forces necessary for clamping while relatively little space is required.

In accordance with a particularly advantageous embodiment of the invention every clamping slide cooperates with a separate shaft, each having a respective control element. This enables both clamping slides to be adjusted uniformly, whereby a positionally correct centrally aligned fixing is achieved.

BRIEF DESCRIPTION OF THE DRAWING

The objects, features and advantages of the invention will be more readily apparent from the following detailed description, when read in conjunction with the single drawing FIGURE, which is a partially cut away perspective view of the mechanism of the invention.

DESCRIPTION OF THE PREFERRED EMBODIMENT

The drawing figure shows machine frame 1 of a machine tool comprising horizontal slideway 2 on which saddle 3 is mounted for longitudinal movement. On top of the saddle, guide rails 4 are provided which extend across horizontal slideway 2 and on which pallet support 5 for accommodating work pallet 6 is movably guided. The horizontal movement of saddle 3 and pallet support 5 are performed by drive motors (not illustrated).

At the front of machine frame 1, pallet changer 7 is provided which is adapted for automatically switching work pallet 6, accommodated on pallet support 5, for a pallet waiting in the stand-by position.

Pallet changer 7 comprises support column 8 powered for lifting and lowering movement and having support structure 9 mounted on the upper end thereof. Driver 11 is disposed on the support structure and adapted to be rotated about the vertical axis by drive means. In the illustrated embodiment, the driver is mounted on a drive shaft rotatably mounted in support 9, the shaft being rotatable about 180° by way of a drive mechanism such as hydraulic motor 48.

Partially sectional driver 11 comprises upwardly oriented, diametrically opposed carrying elements 12 which, upon a change of pallets, are brought into engagement with receiving profile 13 disposed sideways on work pallet 6. The carrying elements are configured as rail-like protrusions having lateral engagement faces 14 and partly bevelled planar top face 15.

Rail-like receiving profiles 13 disposed on the vertical end faces of work pallets 6 have a U-shaped cross section with two depending support legs 16 spaced by groove 17 formed therebetween. The width of groove 17 is adapted to the spacing between lateral guide faces 14 of the carrying elements formed on driver 11 so that the vertical inner faces of groove 17 are brought into abutting relationship with lateral guide faces 14 of carrying elements 12 during a pallet switching operation.

Due to the configuration of driver 11 on pallet changer 7 and receiving profiles 13 sideways on work pallets 6, it is possible simultaneously to lift and subsequently pivot in cantilever fashion both the stand-by pallet and the pallet arranged on pallet support 5. Since all of the supporting forces and moments applied by work pallets 6 to driver 11 are accommodated by planar top face 15 and lateral guide faces 14 of carrying elements 12, no additional receiving and guiding elements are necessary on which the pallets would have to be guided and correspondingly supported along their pallet switching path.

In the corner areas of work pallet 6, vertically depending centering bolts 18 are mounted which engage corresponding bolt holes 19 provided on the horizontal top of pallet support 5 for precisely locating the work pallet on the pallet support.

Pallet fixing means 20 is provided for fixing work pallet 6 on pallet support 5, and vertically depending fixing bolt 21 disposed in the centre of the work pallet is inserted into central vertical hole 22 formed in the pallet support where it is fixed by clamping means 23 which will be explained in detail below. Clamping means 23 comprises two cylindrical clamping slides 24 which are guided for movement in through-hole 25 extending across vertical hole 22. Clamping slides 24, which oppose each other in the vicinity of vertical hole 22, are biased against each other by means of compression springs 26. Each clamping slide 24 cooperates with a compression spring 26 respectively disposed between outer end face 27 of the clamping slide and an end portion or abutment 28 mounted at the respective outer end of through-hole 25 in pallet support 5. Compression spring 26 is composed of a plurality of serially arranged Belleville spring washers accommodated on cylindrical extension 29 of the clamping slide movably guided within end portion 28. The bias of clamping slide 24 is easily adjusted by suitable choice and arrangement of the Belleville washers and by adjustably disposing end portion 28 inside pallet support 5.

Key 31 is respectively provided on opposing inner end faces 30 of the clamping slides. In the clamping position the two keys 31 of clamping slides 24, which are inwardly displaced by compression springs 26, engage in a diametrically opposed keyways 32 formed on fixing bolt 21. Keyways 32 are formed on clamping projection 33 at the bottom end of the fixing bolt projecting between the two clamping slides.

Inside pallet support 5, two mutually parallel shafts 34 are rotatably mounted to extend at right angles to the longitudinal axis of clamping slides 24 and respectively carry control element 35 at their inner ends. Each of the two clamping slides has lateral recess 36 for engagement by respective cooperating control element 35 for operating the clamping slide. Control element 35 is formed by a groove machined in the end face of shaft 34 and adapted to span roller 37 mounted on clamping slide 24. The arrangement of clamping slide 24 and shaft 34, which is offset with respect to height, causes the transformation of the rotary motion of shaft 34 to an axial movement of the clamping slide.

Threaded pin 39 provided in pallet support 5 cooperates with a stop tangentially mounted on shaft 34 to cause a limitation of the rotary movement of the shaft and hence of the stroke of clamping slide 24 in the absence of a pallet 6.

Control element 35 may also be formed by a roller which is rotatably mounted in shaft 34 and offset from the shaft axis, the surface of the roller protruding laterally beyond the outer surface of shaft 34. Shafts 34 are mounted for rotation and retained against axial displacement by way of two bearing bushings 38 in the end of pallet support 5 which faces pallet changer 7. A respective operating lever 40 is mounted non-rotatably at the front ends of the shafts which project from the bearing bushings. Operating levers 40 are fixed to the shaft ends so as to be outwardly pivoted relative to the vertically downwardly oriented position when clamping slides 24 adopt their engaging position on fixing bolt 21. Rotary guide roller 41 is provided in the vicinity of the lower outer edge of operating lever 40, the surface of the roller laterally protruding beyond the outer edge of the operating lever.

On the end face of support 9 facing pallet support 5 there is provided coupling member 42 beneath driver 11 for engagement therein by operating levers 40 provided on shafts 34. Coupling member 42 comprises C-shaped frame 43 mounted on support 9 with two legs 44 facing toward the pallet support. Guide lugs 45 are provided on the ends of legs 44 facing the pallet support. Guide lugs 45 have first side face 46 which extends initially obliquely inwardly from top to bottom and is contiguous with vertical second side face 47. When support 9 on pallet changer 7 is elevated, lateral guide rollers 41 of operating levers 40 ride along the side faces whereby the operating levers are pivoted inwardly to release the clamping means.

The pallet switching mechanism described above operates as described below.

For a pallet switching operation, pallet support 5 initially moves over saddle 3 along guide rails 4 to a predetermined pallet switching position, in which receiving profiles 13 provided on work pallet 6 are in alignment with carrying elements 12 of driver 11. Then, support column 8 is elevated together with support 9 by suitable drive means, for instance, a hydraulic cylinder, in the direction of arrow A. Due to the elevating motion of support 9 on pallet changer 7, lateral guide rollers 41 of operating levers 40 initially come into engagement with the upper edges of inclined side faces 46 formed on guide lugs 45. While the elevating motion of support 9 progresses, the operating levers, which are pivoted outwardly in the locking position, are pivoted to the vertical position by their abutment on obliquely inwardly extending side faces 46 in the direction of the arrow B, while lateral guide rollers 41 of the operating levers ride along the inclined side faces of guide lugs 45.

The rotation of operating levers 40 is transmitted via shafts 34 to control elements 35, whereby rollers 37 are moved outwardly by actuating cams in control elements 35. Clamping slides 24 are thereby moved against the action of compression springs 26 from the locking position on locking bolt 21 to an outer released position. Keys 31 formed on inner end faces 30 of the clamping slides are moved out of engagement with keyways 32 on locking bolt 21 so that the latter is completely released. During further elevation of support 9 operating levers 40 are maintained via vertical side faces 47 on guide lugs 45 in the releasing position until finally carrying element 12 on driver 11 completely engages in receiving profile 13 on work pallet 6 and the work pallet is lifted.

The distance between driver 11 and coupling member 42 is determined such that the clamping means has been completely disengaged before the pallet is elevated. The elevating motion of support 9 ceases when centering bolts 18 are completely lifted out of their receiving holes 19 and the pallet, which is above the pallet support, as well as the stand-by pallet, are suspended cantilever-fashion by driver 11. Thereupon the driver is rotated by 180° in the direction of the arrow C to effect a change of position of the two pallets. Subsequently, support 9 is lowered.

While this shifting movement is carried out, centering bolts 18 first come in engagement with receiving holes 19 whereby precise positioning of work pallet 6 is achieved. When the work pallet rests completely on pallet support 5, carrying elements 12 of driver 11 are first disengaged from receiving profile 13 on the work pallet. On further lowering of support 9 the guide rolls, which are urged by compression springs 26 against the side faces of guide lugs 45, ride along vertically side faces 47 and thereafter on inclined side faces 46. Thereby operating levers 40 are rotated outwardly whereby clamping slides 24 are moved by the compression springs from the releasing position to the locking position. Keys 31 on the end faces of the clamping slides now engage in lateral keyways 32 of locking bolt 21. After the pallets have been switched, replaced work pallet 6 is again fixed on pallet support 5 and may be moved along saddle 3 to a corresponding machining position.

In view of the above description it is likely that modifications and improvements will occur to those skilled in the art which are within the scope of the accompanying claims. It is possible in the illustrated embodiment, for instance, to lower the cantilevered stand-by pallet to another pallet support, a pallet collecting station or a pallet conveying system where it will then be fixed by fixing means configured in accordance with the instant invention. Moreover, the mechanical coupling between the vertically movable support and the shaft for operating the clamping means may also be achieved by other transmission mechanisms adapted to be coupled to each other, for instance, by a rack-and-pinion gear, a cam disk or the like, for converting a linear movement to a rotary movement.

What is claimed is:

1. An automatic pallet switching mechanism for machine tools, said mechanism comprising:
   a pallet support for holding a work pallet in a fixed position;
   a pallet changer having a vertically movable support structure and a driver rotatably mounted thereon for elevating and pivoting the work pallet; and
   a pallet fixing device having clamping means disposed inside the pallet support for securing a locking bolt mounted on the work pallet, said clamping means comprising:
   two clamping slides which are biased against each other by compression springs, the mutually facing ends of said clamping slides being formed with keys;
   lateral keyways in the locking bolt configured for locking engagement therein of said keys of said clamping slides;
   a lateral recess in at least one of said clamping slides for engagement therein of a control element; and
   at least one shaft mounted in said pallet support for carrying said control element at one end thereof and having its other end adapted to be coupled by means of an operating member to said vertically movable support structure of said pallet changer.

2. The mechanism recited in claim 1, wherein said control element comprises a groove formed in the end face of said shaft and a roller eccentrically offset relative to the axis of said shaft, said roller being disposed for movement together with said clamping slide.

3. The mechanism recited in either claim 1 or 2, wherein said operating member is an operating lever mounted on a free end of said shaft for rotation therewith, said support structure has an end face adjacent said pallet support, said operating lever engaging a coupling member on said end face of said support structure when said support structure is elevated.

4. The mechanism recited in claim 3, wherein said coupling member comprises a frame with at least one leg facing toward said pallet support and being provided with a guide lug.

5. The mechanism recited in claim 4, wherein said guide lug is formed with a first side face extending initially obliquely inwardly from top to bottom and thereafter has a vertical second side face contiguous with said first side face.

6. The mechanism recited in claim 3, wherein said operating lever has an outside portion provided with a rotary guide roller adapted to be engaged with said coupling member.

7. The mechanism recited in claim 4, wherein said operating lever has an outside portion provided with a rotary guide roller adapted to be engaged with said coupling member.

8. The mechanism recited in claim 5, wherein said operating lever has an outside portion provided with a rotary guide roller adapted to be engaged with said coupling member.

9. The mechanism recited in claim 1, wherein each said clamping slide has an outer end face, said compression springs for biasing said clamping slides being formed of a plurality of successive Belleville spring washers disposed between said respective outer end faces of said clamping slides and an end portion mounted in said pallet support.

10. The mechanism recited in claim 2, wherein each said clamping slide has an outer end face, said compression springs for biasing said clamping slides being formed of a plurality of successive Belleville spring washers disposed between said respective outer end faces of said clamping slides and an end portion mounted in said pallet support.

11. The mechanism recited in claim 3, wherein each said clamping slide has an outer end face, said compression springs for biasing said clamping slides being formed of a plurality of successive Belleville spring washers disposed between said respective outer end faces of said clamping slides and an end portion mounted in said pallet support.

12. The mechanism recited in claim 4, wherein each said clamping slide has an outer end face, said compression springs for biasing said clamping slides being formed of a plurality of successive Belleville spring washers disposed between said respective outer end faces of said clamping slides and an end portion mounted in said pallet support.

13. The mechanism recited in claim 5, wherein each said clamping slide has an outer end face, said compression springs for biasing said clamping slides being formed of a plurality of successive Belleville spring washers disposed between said respective outer end faces of said clamping slides and an end portion mounted in said pallet support.

14. The mechanism recited in claim 6, wherein each said clamping slide has an outer end face, said compression springs for biasing said clamping slides being formed of a plurality of successive Belleville spring washers disposed between said respective outer end faces of said clamping slides and an end portion mounted in said pallet support.

15. The mechanism recited in claim 7, wherein each said clamping slide has an outer end face, said compression springs for biasing said clamping slides being formed of a plurality of successive Belleville spring washers disposed between said respective outer end faces of said clamping slides and an end portion mounted in said pallet support.

16. The mechanism recited in claim 8, wherein each said clamping slide has an outer end face, said compression springs for biasing said clamping slides being formed of a plurality of successive Belleville spring washers disposed between said respective outer end faces of said clamping slides and an end portion mounted in said pallet support.

* * * * *